(12) United States Patent
Choiniere et al.

(10) Patent No.: US 10,853,467 B2
(45) Date of Patent: Dec. 1, 2020

(54) DATA ACCESS CONTROL USING MULTI-DEVICE MULTIFACTOR AUTHENTICATION

(71) Applicant: BANK OF AMERICA CORPORATION, Charlotte, NC (US)

(72) Inventors: Matthew M. Choiniere, Charlotte, NC (US); Michael E. Toth, Charlotte, NC (US); Hitesh J. Shah, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 353 days.

(21) Appl. No.: 15/938,516

(22) Filed: Mar. 28, 2018

(65) Prior Publication Data
US 2019/0303553 A1    Oct. 3, 2019

(51) Int. Cl.
G06F 21/34 (2013.01)
G06F 1/16 (2006.01)
G06F 21/32 (2013.01)
G06F 13/10 (2006.01)

(52) U.S. Cl.
CPC .............. *G06F 21/34* (2013.01); *G06F 1/163* (2013.01); *G06F 21/32* (2013.01); *G06F 13/102* (2013.01)

(58) Field of Classification Search
CPC .......... G06F 21/34; G06F 1/163; G06F 21/32; G06F 13/102; G06F 21/35
See application file for complete search history.

(56) References Cited

U.S. PATENT DOCUMENTS

| | | | |
|---|---|---|---|
| 8,810,430 B2 | 8/2014 | Proud | |
| 8,868,683 B1 * | 10/2014 | Bacastow | H04L 63/20 709/217 |
| 9,189,901 B2 | 11/2015 | Agrafioti et al. | |
| 9,319,419 B2 | 4/2016 | Sprague et al. | |
| 9,472,033 B2 | 10/2016 | Agrafioti et al. | |
| 9,554,274 B1 | 1/2017 | Castinado et al. | |
| 9,684,775 B2 * | 6/2017 | Gupta | G06F 21/31 |
| 9,700,799 B2 | 7/2017 | Millegan et al. | |
| 9,704,154 B2 | 7/2017 | Xing et al. | |
| 9,743,279 B2 | 8/2017 | Rachuri et al. | |
| 9,762,581 B1 | 9/2017 | Wang et al. | |
| 9,764,097 B2 | 9/2017 | Hessler | |

(Continued)

*Primary Examiner* — Christopher A Revak
(74) *Attorney, Agent, or Firm* — Michael A. Springs

(57) ABSTRACT

An authentication device that includes an authentication engine configured to detect devices proximate to a terminal and to identify a user profile based on the detected one or more devices. The user profile identifies at least one of the detected devices in a device registry. The authentication engine is further configured to receive a data access request for a data resource and to identify authentication requirements for a multifactor authentication process for the user based on the detected devices. Identifying the authentication requirements includes setting types of authentication and a number of authentication levels that are used for performing multifactor authentication with the user. The authentication engine is further configured to execute the multifactor authentication process for the user, to determine whether the user has satisfied the authentication requirements, and to provide access to the data resource in response to determining the user has satisfied the authentication requirements.

20 Claims, 2 Drawing Sheets

(56) References Cited

U.S. PATENT DOCUMENTS

Figure 1:
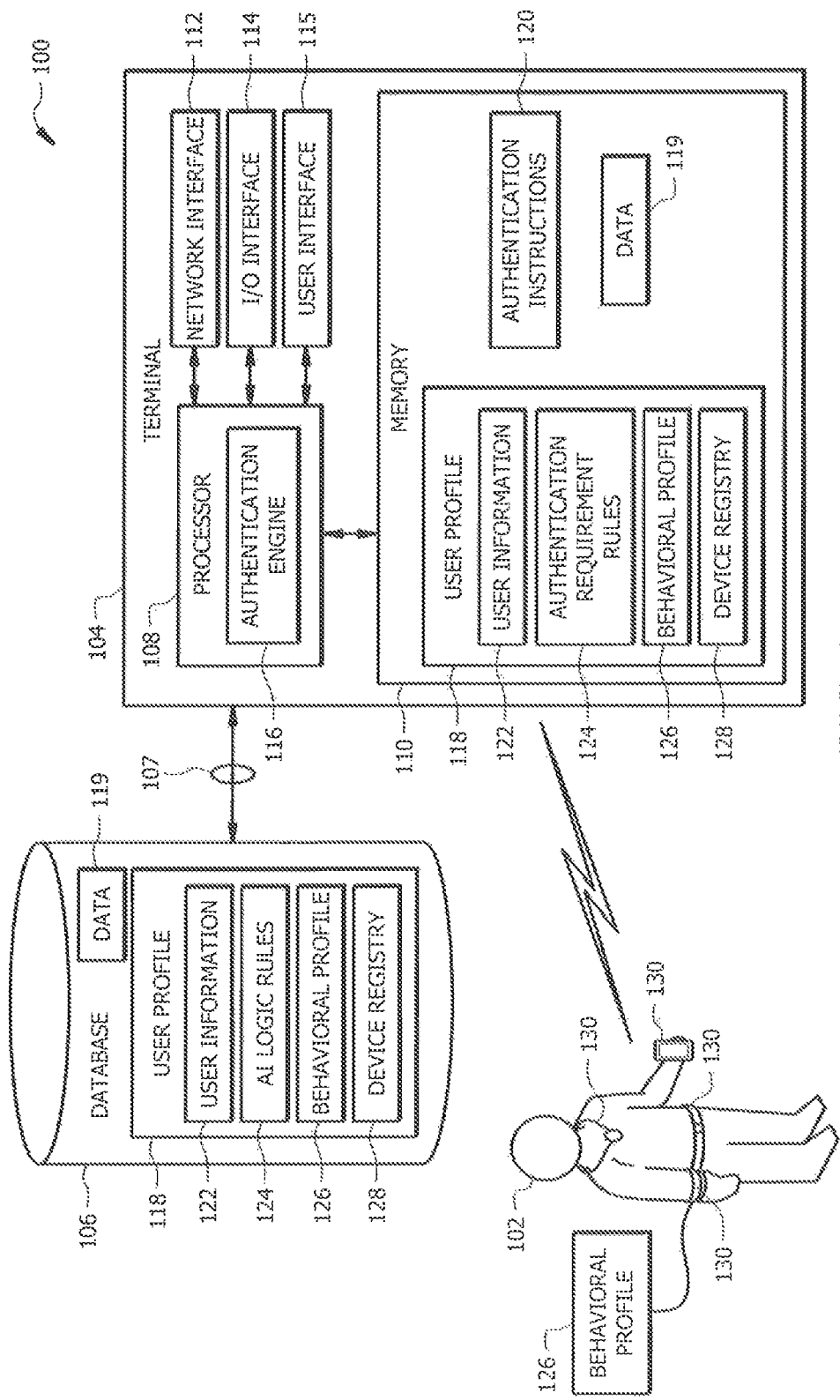

| | | | | |
|---|---|---|---|---|
| 9,819,684 | B2* | 11/2017 | Cernoch | H04L 63/08 |
| 10,057,227 | B1* | 8/2018 | Hess | H04L 63/0853 |
| 10,169,562 | B2* | 1/2019 | Bandyopadhyay | G06F 21/34 |
| 10,574,650 | B2* | 2/2020 | Wallace | G06K 9/00906 |
| 2016/0154952 | A1 | 6/2016 | Venkatraman et al. | |
| 2017/0041296 | A1* | 2/2017 | Ford | H04W 12/06 |
| 2017/0061424 | A1 | 3/2017 | Dent et al. | |
| 2017/0091745 | A1 | 3/2017 | Castinado et al. | |
| 2017/0372059 | A1* | 12/2017 | Sindia | G06N 20/00 |
| 2019/0132303 | A1* | 5/2019 | Kurian | H04L 63/068 |
| 2019/0188368 | A1* | 6/2019 | Hastings | G06F 21/35 |
| 2019/0272589 | A1* | 9/2019 | Simpson | G06Q 50/30 |
| 2019/0386984 | A1* | 12/2019 | Thakkar | H04L 63/18 |
| 2020/0252403 | A1* | 8/2020 | Cernoch | G06F 21/44 |

\* cited by examiner

DATA ACCESS CONTROL USING MULTI-DEVICE MULTIFACTOR AUTHENTICATION

TECHNICAL FIELD

The present disclosure relates generally to information security and providing data access control using multi-device multifactor authentication.

BACKGROUND

Conventional systems typically authenticate users using a predetermined set of multifactor authentication rules. For example, a conventional system may authenticate a user using a username and password combination with a pre-defined number of security questions. In these systems, the number of authentication levels (e.g. number of security questions) and the authentication types are static and do not change. Because conventional systems use a static multi-factor authentication processes, a bad actor will have access to the user's sensitive information if they are able to obtain the user's authentication information. Once a bad actor has access to a user's information they can pose as the user to perform malicious activities such as data exfiltration. Thus, it is desirable to provide increased data access control and information security to prevent unauthorized access to information stored in a network.

SUMMARY

Computer networks allow information to be stored and exchanged among devices anywhere in the world. One of the technical challenges inherent to computer networks is providing data access control and information security for the data in the network. Computer networks need to control who has access to information stored in the network. However, controlling access to stored information is challenging because a user can be located anywhere in the world when requesting access to information. Typically, computer networks rely on authentication protocols for authenticating a user requesting access to information.

Conventional systems typically authenticate users by using a predetermined set of multifactor authentication rules. For example, a conventional system may authenticate a user using a username and password combination with a predefined number of security questions. In these systems, the number of authentication levels (e.g. number of security questions) and authentication types are static and do not change. Using a static multifactor authentication process with a predefined number of authentication requirements has several drawbacks. For example, a user may provide authentication information as responses to a fixed set of questions in order to pass authentication with a conventional static multifactor authentication process. This means that if a bad actor is able to determine the responses to the fixed set of questions, they will have access to the user's information and can even pose as the user to use the computer network. Once a bad actor has access to a user's information they can access the network and its resources to perform malicious activities such as data exfiltration. Static multifactor authentication provides some protection, however the fixed number of authentication requirements leaves the computer network vulnerable.

In addition, authenticating a user's identity also poses several technical challenges. In a conventional system, the system only relies on provided information to confirm the identity of the user. This means that anyone who provides the authentication information for a user can pose as the user. For example, if a bad actor is able to obtain a user's authentication information, then the bad actor will be able to spoof the system into authenticating the bad actors as the user. Conventional systems are unable to detect or determine whether the authentication information is being provided by the actual user or a bad actor posing as the user. This limitation leaves the network vulnerable to attacks by bad actors posing as other users in order to access information stored in the network.

The present embodiment presents several technical advantages that improve data access control and information security in a computer network. In contrast to convention systems, the data access control system is configured to implement a dynamic multifactor authentication process that adjusts the number of authentication layer and/or the authentication types used for multifactor authentication based on the devices that are detected by the data access control system. In other words, the data access control system is configured to dynamically adjust the number of authentication layer and/or the authentication types used for multifactor authentication based on device types and the combination of devices that are detected proximate to a terminal in the data access control network. This type of multi-device multifactor authentication improves data access control and information security for the system because it does not rely on static authentication requirements. Instead, a data access control system is able to dynamically adjust authentication requirements based on different conditions. For example, the system is able to increase the difficulty of authentication requirements for passing authentication when system detects conditions that indicate additional network security is necessary. The system is also able to relax or reduce the difficulty of authentication requirements for passing authentication requirements when the system detects conditions that indicate the additional network security is not necessary. Using multi-device multifactor authentication enables the system to provide different levels of network security and data access control. This is in contrast to traditional systems that are unable to provide flexible or dynamic multifactor authentication.

Unlike a static multifactor authentication process that relies on a fixed set of authentication requirements, a multi-device multifactor authentication process increases data access control because to gain access to a user's information, a bad actor will need to know which devices that are registered for authentication, the combinations of devices that are used for multifactor authentication, and the authentication information for a given combination of devices. This type of multi-device multifactor authentication process provides improved network security by increasing the complexity and difficulty of the authentication requirements for a bad actor to gain unauthorized access to information compared to a static type of multifactor authentication.

Additionally, the multi-device multifactor authentication process also provides a technical solution to problem of determining whether a user or a bad actor posing as the user is providing information for authentication. The multi-device multifactor authentication process provides the ability for the system to determine whether the actual user is present. The data access control system is able to use knowledge about the presence of the detected registered devices as well as information provided by the user to confirm that the user is present during authentication. This process further improves network security by controlling who has access to data or resources within the network.

Certain embodiments of the present disclosure may include some, all, or none of these advantages. These advantages and other features will be more clearly understood from the following detailed description taken in conjunction with the accompanying drawings and claims.

BRIEF DESCRIPTION OF TIRE DRAWINGS

For a more complete understanding of this disclosure, reference is now made to the following brief description, taken in connection with the accompanying drawings and detailed description, wherein like reference numerals represent like parts.

Figure 2:
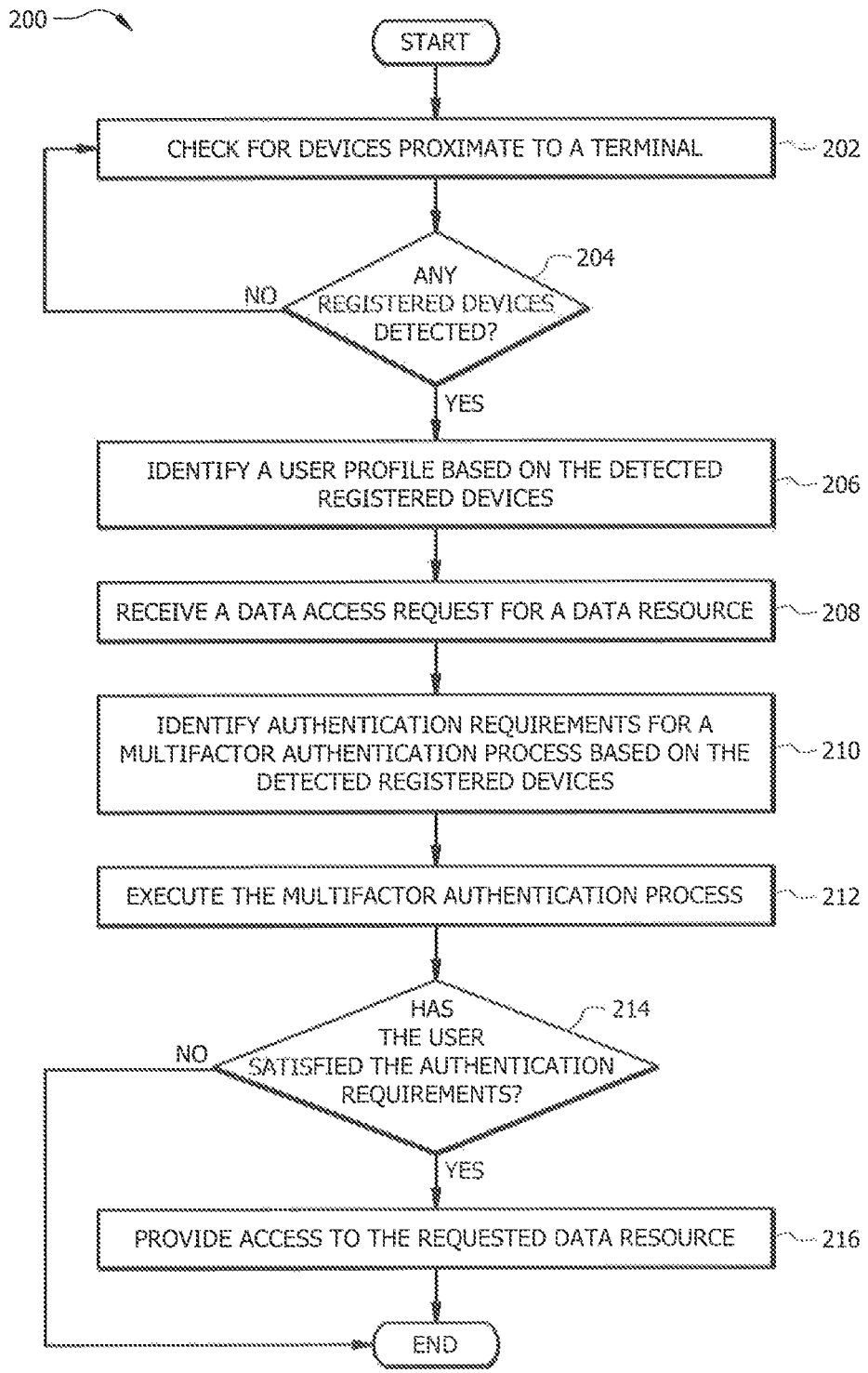

FIG. 1 is a schematic diagram of an embodiment of a data access control system; and FIG. 2 is a flowchart of an embodiment of a multi-device multifactor authentication method for a data access control system.

DETAILED DESCRIPTION

FIG. 1 is a schematic diagram of an embodiment of a data access control system 100. In one embodiment, the data access control system 100 comprises a terminal 104 in signal communication and operably coupled to a database 106. In FIG. 1, the terminal 104 and the database 106 are shown as separate components, however, in another embodiment, the terminal 104 and the database 106 may be integrated with each other. The data access control system 100 provides data access control by using the terminal 104 to implement a multi-device multifactor authentication process to authenticate a user 102. The data access control system 100 is configured to dynamically adjust the number of authentication layers and/or the authentication types used for performing multifactor authentication based on device types and/or the combination of devices 130 that are detected proximate to the terminal 104.

This type of multi-device multifactor authentication improves data access control and information security for the system because it does not rely on static authentication requirements, instead, the data access control system 100 is able to dynamically adjust authentication requirements based on different conditions. For example, the data access control system 100 is able to increase the difficulty of authentication requirements for passing authentication when the data access control system 100 detects conditions that indicate additional network security is necessary. The data access control system 100 is also able to relax or reduce the difficulty of authentication requirements for passing authentication requirements when the data access control system 100 detects conditions that indicate the additional network security is not necessary. Using multi-device multifactor authentication enables the data access control system 100 to dynamically provide different levels of network security and data access control. Additionally, the data access control system 100 uses knowledge about the presence of the detected registered devices 130 as well as authentication information provided by the user 102 to confirm that the user 102 is present during authentication. This process further improves network security of the system by controlling who has access to data and/or resources within the network.

Examples of devices 130 include, but are not limited to, mobile user devices, smart phones, tablets, laptops, computers, Internet-of-thing (IoT) devices, wearable devices (e.g., smart watches and smart bracelets), universal serial bus (USB) devices, or any other suitable type of device. In one embodiment, a wearable device is any device configured to worn by the user 102. For examples, a wearable device may be a wireless device (e.g. IoT device) integrated with a ring, a belt, a necklace, shoes, earrings, pants, a shirt, a jacket, a watch, a bracelet, or any other suitable type of wearable garment or accessory. Devices 130 are configured to be detected by the terminal 104 using any suitable wired or wireless communication protocol. In some embodiments, devices 130 may be configured to communicate data with the terminal 130. For example, a device 130 may be configured to send a behavioral profile 126 to the terminal 104 in response to a request for the behavioral profile 126.

In one embodiment, a device 130 may be configured to collect data and/or biometric signals for a user 102 and store the collected information as a behavioral profile 126. For example, a device 130 may be a smart phone configured to collect user information, browser history information, geolocation information, transaction history, financial information, or any other suitable type of information and store the collected information as a behavioral profile 126 in the device 130. As another example, a device 130 may be a smart watch or bracelet configured to collect biometric signals such as heart rate, blood pressure, motion patterns (e.g. gesture movements or walking patterns), or any other suitable type of biometric signal and store the collected information as a behavioral profile 126.

The terminal 104 may be a standalone device or integrated with another other device. Examples of the terminal 104 include, but are not limited to, a computer, a kiosk, an automated teller machine (ATM), a point-of-sales terminal, or any other suitable type of device. In one embodiment, the terminal 104 comprises a processor 108, a memory 110, a network interface 112, an input/output (I/O) interface 114, and a user interface 115. The terminal 104 may be configured as shown or in any other suitable configuration. For example, the terminal 104 may comprise additional components and/or one or more shown components may be omitted.

The processor 108 is implemented as one or more central processing unit (CPU) chips, logic units, cores (e.g. a multi-core processor), field-programmable gate array (FPGAs), application specific integrated circuits (ASICs), or digital signal processors (DSPs). The processor 108 is communicatively coupled to and in signal communication with the memory 110, the network interface 112, the I/O interface 114, and the user interface 115. The processor 108 is configured to receive and transmit electrical signals among one or more of the memory 110, the network interface 112, the I/O interface 114, and the user interface 115. The electrical signals are used to send and receive data and/or to control or communicate with other devices. The processor 108 may be operably coupled to one or more other devices (not shown).

The processor 108 is configured to process data and may be implemented in hardware or software. The processor 108 is configured to implement various instructions. For example, the processor 108 is configured to implement an authentication engine 116 configured to detect devices 130 that are proximate to the terminal 104, to determine whether any of the detected devices 130 are in the device registry 128 for a user 102, and to identify authentication requirements for a multifactor authentication process for the user 102 based on the detected devices 130. The authentication engine 116 is further configured to execute the multifactor authentication process for the user 102 and to authenticate or provide access to a data resource in response to determining that the user 102 has satisfied the authentication requirements. Additional details and an example of the authentication engine 116 in operation are described in FIG. 2. In an embodiment, the authentication engine 116 is implemented using logic units, FPGAs, ASICs, DSPs, or any other suitable hardware.

The memory 110 comprise one or more disks, tape drives, or solid-state drives, and may be used as an over-flow data storage device, to store programs when such programs are selected for execution, and to store instructions and data that are read during program execution. The memory 110 may be volatile or non-volatile and may comprise read-only memory (ROM), random-access memory (RAM), ternary content-addressable memory (TCAM), dynamic random-access memory (DRAM), and static random-access memory (SRAM). The memory 110 is operable to store authentication instructions 120, user profiles 118, data 119, and/or any other type of data or instructions. The authentication instructions 120 may comprise any suitable set of instructions, logic, rules, or code operable to execute the authentication engine 116.

In one embodiment, a user profile 118 comprises user information 122, authentication requirement rules 124, a behavioral profile 126, and a device registry 128. The user profile 118, the user information 122, authentication requirement rules 124, the behavioral profile 126, and the device registry 128 may be in any suitable format and data structure, in other embodiments, the user profile 118 may comprise any other suitable type and/or combination of information.

The user information 122 may include any information associated with a user 102. For example, the user information 122 may comprise a name, an identifier, account information, addresses, phone numbers, email addresses, or any other suitable type of information linked with the user 102.

The behavioral profile 126 comprises historical information associated with a user 102. In other words, a behavioral profile 126 comprise data collected for a user 102 over a period of time. Examples of data stored in a behavioral profile 126 include, but are not limited to, browser history information, geolocation information, transaction history, financial information, biometric signals such as heart rate, blood pressure, motion patterns (e.g., gesture movements or walking patterns), or any other suitable type of information or biometric signal. In some embodiments, the authentication engine 116 is configured to use the behavioral profile 126 information for authentication a user 102. Examples of using a behavioral profile 126 for multifactor authentication are described in FIG. 2.

The device registry 128 is configured to identify devices 130 registered with a user 102. For example, the device registry 128 may be a data structure (e.g., a table) that lists devices 130 and device information linked with a user 102. The device information may include information such as an identifier (e.g. MAC address) and a device type. For example, the device type may indicate that a device 130 is a wearable device, a smart phone, or any other type of device. The authentication engine 116 is configured to use the device registry 128 to determine whether a detected device is registered to or linked with a user 102.

The authentication engine 116 uses the authentication requirement rules 124 to provide dynamic authentication requirements for a multifactor authentication process based on different conditions. The authentication requirement rules 124 identify combinations of authentication types that are available as authentication requirements for performing multifactor authentication. Examples of authentication types include, but are not limited to usernames, passwords, security pins, security tokens, security questions, geolocation information, behavioral profile information, or any other suitable type of authentication method as would be appreciated by one ordinary skill in the art. The authentication requirement rules 124 may define different combinations of authentication types and/or number of authentication levels for performing multifactor authentication. For example, the authentication requirement rules 124 may be a data structure (e.g. a table) that maps different combinations of devices 103 listed in the device registry 128 with different combinations of authentication types and/or number of authentication levels for performing multifactor authentication. The authentication requirement rules 124 may be set or defined by the authentication engine 116. In one embodiment, some of the authentication requirement rules 124 may be user-defined.

In one embodiment, the authentication requirements may be set such that more authentication levels are used when fewer devices 130 are detected. For example, the authentication requirements may be set to use two authentication levels when three or more devices 130 are detected and set to use four authentication levels when less than three devices 130 are detected. In this example, the authentication requirements are configured to provide increased data access control and information security when fewer devices 130 are detected. When multiple devices 130 are detected the authentication engine 116 has increased confidence that the user 102 is present and can relax or reduce the authentication requirements.

In one embodiment, the authentication requirements may be set such that fewer authentication levels are used when a particular device 130 is present. For example, the authentication requirements may be set to use three authentication levels when a smart watch is present and set to use five authentication levels when the smart watch is not present. In this example, the authentication engine 116 has increased confidence that the user 102 is present when a particular device 130 (e.g. a more secure device) is present and can relax or reduce the authentication requirements.

In another embodiment, the authentication requirements may be set such that fewer authentication levels are used when a particular combination of devices 130 are present. For example, the authentication requirements may be set to use two authentication levels when a mobile phone and a smart watch are present and set to use six authentication levels when the mobile phone or the smart watch are not present. In this example, the authentication engine 116 has increased confidence that the user 102 is present when the combination of devices 130 are present and can relax or reduce the authentication requirements.

Data 119 may comprise any suitable type of data resource. Examples of data resources include, but are not limited to, user information, account information, files, electronic documents, images, audio files, Internet content, or any other type of data.

The network interface 112 is configured to enable wired and/or wireless communications and to communicate data through a network, system, and/or domain. Examples of the network interface 112 include, but are not limited to, a local area network (LAN) interface, a personal area network (PAN) interface, a wide area network (WAN) interface, a Wi-Fi interface, or any other suitable communication interface as would be appreciated by one of ordinary skill in the art upon viewing this disclosure. The network interface 112 is configured to allow the processor 108 to send and receive signals with database 106, a registered device 130, a user device, a computer, a modem, a switch, a router, a bridge, a server, a client, and/or any other suitable type of device. The network interface 112 is configured to employ any suitable communication protocol.

The I/O interface 114 is configured to enable wired and/or wireless communications between the terminal 104 and one or more devices 130 external to the terminal 104. Examples of the I/O interface 114 include, but are not limited to, a Bluetooth interface, a radio frequency identifier (RFID) interface, a near-field communication (NFC) interface, a ZigBee interface, a Wi-Fi interface, or any other suitable communication interface as would be appreciated by one of ordinary skill in the art upon viewing this disclosure. The I/O interface 114 is configured to detect one or more device 130 that are proximate to the terminal 104. For example, the I/O interface 114 is configured to detect when a mobile device or smart watch is within 10 feet of the terminal 104. In other examples, the I/O interface 114 may be configured to detect when a device 130 is within any other suitable distance from the terminal 104. The I/O interface 114 is further configured to allow the processor 108 to communicate (e.g. send and receive messages) with the devices 130 proximate or adjacent to the terminal 104. For example, the I/O interface 114 may be configured to request and receive data (e.g. behavioral profiles 126) from the devices 130.

User interface 115 may be configured to present information to a user 102 using the terminal 104. For example, the user interface 115 may comprise a graphical user interface (GUI). The GUI may be employed to provide interfaces that allow the user 102 to view and interact with programs executed on the terminal 104. Examples of the user interface 115 include, but are not limited to, touch screens, a light emitting diode (LED) display, an organic LED (OLED) display, an active-matrix OLED (AMOLED), a projector display, a cathode ray (CRT) monitor, or any other suitable type of display as would be appreciated by one of ordinary skill in the art upon viewing this disclosure. The user interface 115 may comprise any combination of buttons, keypads, touchpads, knobs, or any other suitable mechanism for receiving inputs from a user 102. In one embodiment, the user interface 115 is configured to receive input from a user 102 to generate a data access request or a transaction request. For example, the authentication engine 116 is configured to present information on the user interface 115 to the user 102 for generating a data access request for accessing a data resource (e.g. account information). The authentication engine 116 is configured to use input from the user 102 via the user interface 115 to generate a request.

Examples of the database 106 include, but are not limited to, databases, memories, servers, computing devices, or any other suitable type of device. In FIG. 1, the data access control system 100 shows one database 106. In other embodiments, the data access control system 100 may comprise any other suitable number of databases in signal communication with the terminal 104. The database 106 may be in signal communication with the terminal 104 using any suitable type of wired or wireless connection and communication protocol. The database 106 is configured to send user profiles 118, data 119, and/or any other type of data to the terminal 104. In one embodiment, the database 106 is configured to send a user profile 118 to the terminal 104 in response to receiving a user profile request 107. The user profile request 107 may comprise an identifier or any other suitable type of information for identifying a user 102. In one embodiment, the database 106 is configured to send requested data 119 to the terminal 104 in response to receiving a data request. The data request indicates that a user 102 has been authenticated i.e., satisfied the authentication requirements) for the requested data.

FIG. 2 is a flowchart of an embodiment of a multi-device multifactor authentication method 200 for the data access control system 100. In one embodiment, the authentication engine 116 may employ method 200 to authenticate a user 102 before providing access to a data resource. For example, a user 102 may approach the terminal 104 to request account information. In another embodiment, the authentication engine 116 may employ method 200 to authenticate a user 102 for a transaction.

At step 202, the authentication engine 116 check for devices proximate to the terminal 104. In one embodiment, the authentication engine 116 employs a wireless protocol to detect whether any devices 130 are proximate or adjacent to the terminal 104. For example, the authentication engine 116 may employ Bluetooth to discover devices 130 near the terminal 104. In other examples, the authentication engine 116 may employ any other suitable type of wireless protocol to detect devices 130 near the terminal 104. In one embodiment, the authentication engine 116 determines whether any devices 130 are physically connected to the terminal 104. For example, the authentication engine 116 determines whether a device 130 (e.g. a USB device) is plugged into a USB port on the terminal 104.

At step 204, the authentication engine 116 determines whether any registered devices 130 have been detected. In one embodiment, the authentication engine 116 determines a device identifier (e.g. a MAC address or a phone number) for a detected device 130 and uses the device identifier to determine whether the device 130 is present in any of the device registries 128. The device identifier is any suitable identifier that uniquely identifies a device 130. As an example, the authentication engine 116 may use the device identifier as a search token for searching devices registries 128. The authentication engine 116 determines a registered device 130 has been detected when the device identifier for the device 130 is present in a device registry 128. In other words, the authentication engine 116 determines a registered device 130 has been detected when the detected device 130 matches a device 130 in the device registry 128. The authentication engine 116 may repeat this process for any other detected device 130 proximate to the terminal 104. The authentication engine 116 proceeds to step 206 in response to determining that one or more registered devices have been detected. Otherwise, the authentication engine 116 returns to step 202 to continue searching for devices proximate to the terminal 104. At step 206, the authentication engine 116 identifies the user profile 118 linked with the device registry 12$ where the registered device 130 was found.

At step 208, the authentication engine 116 receives a data access request for a data resource. The data access request identifies a user and the requested data resource (e.g. account information). For example, the user 102 may provide a user identifier (e.g., a username) and identify a data resource the user 102 would like to access. As another example, the user 102 may make a data access request as part of an approval request for a transaction. In one embodiment, the user 102 interacts with the user interface 115 of the terminal 104 to generate and send a data access request. In another embodiment, the user 102 may generate and send the data access request using a device 130 (e.g. a smart phone) registered in the device registry 128. For example, the user 102 may use an application on a device 130 to generate and send the data access request to the terminal 104. The data access request may be in any suitable type of format or data structure as would be appreciated by one of ordinary skill in the art.

At step 210, the authentication engine 116 identifies authentication requirements for a multifactor authentication process for the user 102 based on the detected registered devices 130. By dynamically setting the authentication requirements used for authenticating the user 102, the authentication engine 116 is able to provide increased data access control and information security in the event that some of the user's 102 authentication information has been compromised.

In one embodiment, the authentication engine 116 determines the number of registered devices 130 that are proximate to the terminal 104 and sets the number of authentication levels and the types of authentication that are to be used for performing multifactor authentication based at least partially on the number of detected registered devices 130.

In one embodiment, the authentication engine 116 determines whether a particular device 130 has been detected proximate to the terminal 104 and sets the number of authentication levels and the types of authentication that are to be used for performing multifactor authentication based at least partially on whether the device 130 is present. For example, the authentication engine 116 may set authentication requirements with an increased level of difficulty (e.g. more authentication levels and/or more difficult authentication types) when the number of detected devices 130 is below a predetermined threshold value. As another example, the authentication engine 116 may set authentication requirements with a lower level of difficulty (e.g. fewer authentication levels and/or less difficult authentication types) when the number of detected devices 130 is greater than or equal to a predetermined threshold value.

In one embodiment, the authentication engine 116 determines the types of registered devices 130 that are proximate to the terminal 104 and sets the number of authentication levels and the types of authentication that are to be used for performing multifactor authentication based at least partially on the types of detected registered devices 130. For example, the authentication engine 116 may set authentication requirements based on whether wearable devices or a mobile phone are present.

In one embodiment, the authentication engine 116 determines whether a particular combination of devices 130 have been detected proximate to the terminal 104 and sets the number of authentication levels and the types of authentication that are to be used for performing multifactor authentication based at least partially on whether the combination of devices 130 are present. For example, the authentication engine 116 may set authentication requirements based on whether a mobile user device (e.g. a mobile phone or laptop) and at least one wearable device are present.

In one embodiment, the authentication engine 116 determines whether a device 130 configured to generate and store behavioral profiles 126 is present. The authentication engine 116 may set an authentication requirement that uses information from the behavioral profile 126 stored on the device 130. Examples of authentication requirements using information from a behavioral profile 126 stored on the device 130 are described in step 212.

In other embodiments, the authentication engine 116 sets the number of authentication levels and the types of authentication that are to be used for performing multifactor authentication based on any other suitable type of criteria.

In one embodiment, the authentication engine 116 determines the number of authentication levels based on the detected devices 103 and randomly selects authentication types from a list of authentication types listed in the authentication requirement rules 124. In another embodiment, the authentication engine 116 selects the authentication types based on combinations of authentication types identified in the authentication requirement rules 124.

At step 212, the authentication engine 116 execute the multifactor authentication process for the user 102. The authentication engine 116 performs multifactor authentication with the user 102 based on the authentication type and the number of authentication levels defined by the authentication requirement rules 124 in step 210.

In one embodiment, executing the multifactor authentication process comprises receiving a new behavioral Profile 126 from one of the detected devices 130. The new behavioral profile 126 comprises a biometric signal linked with the user 102. The authentication engine 116 compares the biometric signal from the received behavioral profile 126 with a biometric signal in a previously stored behavioral profile 126 linked with the user 102 in the terminal 104. The authentication engine 116 determines that one of the authentication requirements has been satisfied when the biometric signal in the received behavioral profile 126 substantially matches the biometric signal in the previously stored behavioral profile 126.

In one embodiment, executing the multifactor authentication process comprises determining the current location of the user 102. For example, the authentication engine 116 may use the location of the terminal 104 as the current location of the user 102. In another example, the authentication engine 104 may request and use a global positioning system (GPS) location from one of the devices 130 to determine the current location of the user 102. The authentication engine 116 compares the current location to locations associated with the user 102 in a previously stored behavioral profile 126 in the terminal 104. The authentication engine 116 determines that one of the authentication requirements has been satisfied when the current location matches one of the locations associated with the user 102 in the previously stored behavioral profile 126.

At step 214, the authentication engine 116 determines whether the user 102 has satisfied the authentication requirements for the multifactor authentication process. In one embodiment, the authentication engine 116 determines that the user 102 has satisfied the authentication requirements when the user 102 has successfully passed each authentication level. For example, when the authentication requirement rules 124 indicate to perform three levels of authentication with the user 102, the authentication engine 116 determines that the user 102 has satisfied the authentication requirements when the user 102 has successfully passed all three authentication levels, in another embodiment, the authentication 116 may determine that the user 102 has satisfied the authentication requirements when the user 102 has successfully passed at least some of the authentication levels. For example, when the authentication requirement rules 124 indicate to perform five levels of authentication with the user 102, the authentication engine 116 determines that the user 102 has satisfied the authentication requirements when the user 102 has successfully passed more than three authentication levels. In other examples, the authentication engine 116 determines that the user 102 has satisfied the authentication requirements when the user 102 has successfully passed any other suitable number of authentication levels as defined by the authentication requirement rules 124.

The authentication engine 116 proceeds to step 216 in response to determining that the user 102 has satisfied the authentication requirements for the multifactor authentication process. In other words, the authentication engine 116 proceeds to step 216 to fulfill the user's 102 data access request once the user 102 has been authenticated. Otherwise, the authentication engine 116 terminates method 200 in response to determining that the user 102 has not satisfied the authentication requirements for the multifactor authentication process. Using the method 200, the authentication engine 116 is able to determine that the user 102 is present at the terminal 104 based on the presence of devices registered to the user 102 as well as the authentication information provided by the user 102. This provides a technical advantage over conventional systems that are unable to determine whether authentication information is being provided by the user 102 or a bad actor posing as the user 102.

At step 216, the authentication engine 116 provides access to the requested data resource. The authentication engine 116 may provide access to account information, documents, or any other type of data to the user 102 in response to determining that the user 102 has satisfied the authentication requirements. In other embodiments, the authentication engine 116 may employ a method similar to method 200 to authenticate a user 102 for approving transactions, for providing access to a network resource (e.g. a server or virtual machine), or any other application where the user 102 should be authenticated before granting accessing.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(t) as it exists on the date of filing hereof unless the words "means for" or "step for" are explicitly used in the particular claim.

The invention claimed is:

1. An authentication device, comprising:
a memory configured to store a plurality of user profiles, wherein each user profile comprises:
a device registry identifying registered devices linked with a user;
authentication requirements for the user, wherein the authentication requirements vary based on detected devices from the device registry;
an input/output (I/O) interface configured to detect devices using a wireless communication protocol;
an authentication engine implemented by one or more processors operably coupled to the memory and the I/O interface, configured to:
detect one or more devices;
identify a user profile based on the detected one or more devices, wherein identifying the user profile comprises determining at least one of the one or more devices is listed in a device registry of the user profile;
receive a data access request for a data resource, wherein the data access request identifies a user linked with the user profile;
identify authentication requirements for a multifactor authentication process for the user based on the detected one or more devices, wherein identifying the authentication requirements comprises:
setting types of authentication that are used for performing multifactor authentication with the user, wherein setting the types of authentication identifies types of information that will be used for authentication; and
setting a number of authentication levels that are used for performing multifactor authentication with the user, wherein setting the number of authentication levels identifies how many types of information that will be used for authentication;
execute the multifactor authentication process for the user;
determine whether the user has satisfied the authentication requirements;
provide access to the data resource in response to determining the user has satisfied the authentication requirements.

2. The device of claim 1, wherein the data access request is sent by a device listed in the device registry.

3. The device of claim 1, further comprising a user interface, wherein the data access request is generated in response to the user interacting with the user interface.

4. The device of claim 1, wherein detecting the one or more devices comprises detecting at least one wearable device.

5. The device of claim 1, wherein detecting the one or more devices comprises detecting:
a mobile user device; and
at least one wearable device.

6. The device of claim 1, wherein:
the user profile comprises a stored behavioral profile comprising a first biometric signal for the user; and
determining whether the user has satisfied the authentication requirements comprises:
receiving a new behavioral profile from one of the detected devices, wherein the new behavior profile comprises a second biometric signal for the user;
comparing first biometric signal for the user to the second biometric signal for the user;
determining the first biometric signal matches the second biometric signal based on the comparison; and
determining the user satisfies the authentication requirements in response to determining the first biometric signal matches the second biometric signal.

7. The device of claim 1, wherein:
the user profile comprises a behavioral profile identifying locations associated with the user; and
determining the user has satisfied the authentication requirements comprises:
determining the current location of the user;
comparing the current location of the user to the locations associated with the user;
determining whether the current location matches one of the locations associated with the user; and determining the user satisfies the authentication requirements in response to determining the current location matches one of the locations associated with the user.

8. A multifactor authentication method, comprising:
detecting, by an authentication engine, one or more devices proximate to a terminal;
identifying, by the authentication engine, a user profile based on the detected one or more devices, wherein:
the user profile comprises:
a device registry identifying registered devices linked with a user;
authentication requirements for the user, wherein the authentication requirements vary based on detected devices from the device registry; and
identifying the user profile comprises determining at least one of the detected one or more devices is listed in the device registry of the user profile;
receiving, by the authentication engine, a data access request for a data resource, wherein the data access request identifies the user linked with the user profile;
identifying, by the authentication engine, authentication requirements for a multifactor authentication process for the user based on the detected one or more devices, wherein identifying the authentication requirements comprises:
setting types of authentication that are used for performing multifactor authentication with the user, wherein setting the types of authentication identifies types of information that will be used for authentication; and
setting a number of authentication levels that are used for performing multifactor authentication with the user, wherein setting the number of authentication levels identifies how many types of information that will be used for authentication;
executing, by the authentication engine, the multifactor authentication process for the user;
determining, by the authentication engine, whether the user has satisfied the authentication requirements;
providing, by the authentication engine, access to the data resource in response to determining the user has satisfied the authentication requirements.

9. The method of claim 8, wherein the data access request is sent by a device listed in the device registry.

10. The method of claim 8, wherein the data access request is generated in response to the user interacting with a user interface of the terminal.

11. The method of claim 8, wherein detecting the one or more devices proximate to the terminal comprises detecting at least one wearable device.

12. The method of claim 8, wherein detecting the one or more devices proximate to the terminal comprises detecting:
a mobile user device; and
at least one wearable device.

13. The method of claim 8, wherein:
the user profile comprises a behavioral profile identifying locations associated with the user; and
determining whether the user has satisfied the authentication requirements comprises:
determining the current location of the user;
comparing the current location of the user to the locations associated with the user;
determining the current location matches one of the locations associated with the user; and
determining the user satisfies the authentication requirements in response to determining the current location matches one of the locations associated with the user.

14. The method of claim 8, wherein:
the user profile comprises a stored behavioral profile comprising a first biometric signal for the user; and
determining whether the user has satisfied the authentication requirements comprises:
receiving a new behavioral profile from one of the detected devices, wherein the new behavior profile comprises a second biometric signal for the user;
comparing first biometric signal for the user to the second biometric signal for the user;
determining the first biometric signal matches the second biometric signal based on the comparison; and
determining the user satisfies the authentication requirements in response to determining the first biometric signal matches the second biometric signal.

15. An authentication system, comprising:
a database configured to store a plurality of user profiles, wherein a user profile comprises:
a device registry identifying registered devices linked with a user;
authentication requirements for the user, wherein the authentication requirements vary based on detected devices from the device registry;
a terminal in signal communication with the database, comprising:
a network interface configured to:
send a user profile request to the database; and
receive a user profile in response to sending the user profile request;
an authentication engine implemented by one or more processors operably coupled to the network interface, configured to:
detect one or more devices proximate to the terminal;
send a user profile request to the database identifying the detected one or more devices;
receive a user profile in response to sending the user profile request, wherein at least one of the detected one or more device is listed in a device registry of the user profile;
receive a data access request for a data resource, wherein the data access request identifies a user linked with the user profile;
identify authentication requirements for a multifactor authentication process for the user based on the detected one or more devices, wherein identifying the authentication requirements comprises:
setting types of authentication that are used for performing multifactor authentication with the user, wherein setting the type of authentication identifies types of information that will be used for authentication; and
setting a number of authentication levels that are used for performing multifactor authentication with the user, wherein setting the number of authentication levels identifies how many types of information that will be used for authentication;
executing the multifactor authentication process for the user;
determine whether the user has satisfied the authentication requirements;

provide access to the data resource in response to determining the user has satisfied the authentication requirements.

16. The system of claim 15, wherein the data access request is sent by a device listed in the device registry.

17. The system of claim 15, wherein:
the terminal comprises a user interface; and
the data access request is generated in response to the user interacting with the user interface.

18. The system of claim 15, wherein detecting the one or more devices proximate to the terminal comprises detecting at least one wearable device.

19. The system of claim 15, wherein detecting the one or more devices proximate to the terminal comprises detecting:
a mobile user device; and
at least one wearable device.

20. The system of claim 15, wherein:
the user profile comprises a stored behavioral profile comprising a first biometric signal for the user; and
determining whether the user has satisfied the authentication requirements comprises:
receiving a new behavioral profile from one of the detected devices, wherein the new behavior profile comprises a second biometric signal for the user;
comparing first biometric signal for the user to the second biometric signal for the user;
determining the first biometric signal matches the second biometric signal based on the comparison; and
determining the user satisfies the authentication requirements in response to determining the first biometric signal matches the second biometric signal.

* * * * *